(12) United States Patent
Russell

(10) Patent No.: US 7,435,897 B2
(45) Date of Patent: Oct. 14, 2008

(54) APPARATUS AND METHOD FOR MOUNTING PHOTOVOLTAIC POWER GENERATING SYSTEMS ON BUILDINGS

(75) Inventor: Miles Clayton Russell, Lincoln, MA (US)

(73) Assignee: Schott Solar, Inc., Billerica, MA (US)

( * ) Notice: Subject to any disclaimer, the term of this patent is extended or adjusted under 35 U.S.C. 154(b) by 635 days.

(21) Appl. No.: 10/506,145

(22) PCT Filed: Sep. 12, 2002

(86) PCT No.: PCT/US02/29020

§ 371 (c)(1),
(2), (4) Date: Aug. 31, 2004

(87) PCT Pub. No.: WO03/087493

PCT Pub. Date: Oct. 23, 2003

(65) Prior Publication Data

US 2005/0115176 A1    Jun. 2, 2005

Related U.S. Application Data

(60) Provisional application No. 60/371,576, filed on Apr. 11, 2002.

(51) Int. Cl.
*E04D 13/18*    (2006.01)
(52) U.S. Cl. .................. 136/244; 136/291; 248/237; 52/173.3; 52/749.12
(58) Field of Classification Search ............ 52/22, 52/173.3, 749.12, 18; 248/237; 136/251, 136/244, 291; 182/45, 150
See application file for complete search history.

(56) References Cited

U.S. PATENT DOCUMENTS

| | | | |
|---|---|---|---|
| 4,000,734 A | 1/1977 | Matlock et al. | |
| 4,068,427 A * | 1/1978 | Camardo | 52/127.2 |
| 4,316,448 A | 2/1982 | Dodge | |
| 4,336,413 A * | 6/1982 | Tourneux | 136/251 |
| 4,371,139 A | 2/1983 | Clark | |
| 4,611,090 A | 9/1986 | Catella et al. | |
| 4,677,248 A | 6/1987 | Lacey | |
| 4,691,491 A | 9/1987 | Lilley | |
| 4,692,557 A * | 9/1987 | Samuelson et al. | 136/251 |
| 5,125,608 A * | 6/1992 | McMaster et al. | 248/163.1 |
| 5,228,924 A | 7/1993 | Barker et al. | |

(Continued)

*Primary Examiner*—Richard E. Chilcot, Jr.
*Assistant Examiner*—Chi Q Nguyen
(74) *Attorney, Agent, or Firm*—Pandiscio & Pandiscio

(57) ABSTRACT

Rectangular PV modules (6) are mounted on a building roof (4) by mounting stands that are distributed in rows and columns. Each stand comprises a base plate (10) that rests on the building roof (4) and first and second brackets (12, 14) of different height attached to opposite ends of the base plate (10). Each bracket (12, 14) has dual members for supporting two different PV modules (6), and each PV module (6) has a mounting pin (84) adjacent to each of its four corners. Each module (6) is supported by attachment of two of its mounting pins (84) to different first brackets (12), whereby the modules (6) and their supporting stands are able to resist uplift forces resulting from high velocity winds without the base plates (10) being physically attached to the supporting roof structure (4). Preferably the second brackets (14) have a telescoping construction that permits their effective height to vary from less than to substantially the same as that of the first brackets (12).

28 Claims, 8 Drawing Sheets

U.S. PATENT DOCUMENTS

| | | | |
|---|---|---|---|
| 5,333,602 A | 8/1994 | Huang | |
| 5,505,788 A | 4/1996 | Dinwoodie | |
| 5,590,503 A | 1/1997 | Spronken | |
| 5,740,996 A | 4/1998 | Genschorek | |
| 5,788,204 A * | 8/1998 | Goodwin et al. | 248/357 |
| 6,003,629 A * | 12/1999 | Cloutier et al. | 182/45 |
| 6,046,399 A | 4/2000 | Kapner | |
| 6,148,570 A | 11/2000 | Dinwoodie et al. | |
| 6,307,144 B1 | 10/2001 | Mimura et al. | |
| 6,360,491 B1 * | 3/2002 | Ullman | 52/22 |
| 6,370,828 B1 | 4/2002 | Genschorek | |
| 6,414,237 B1 | 7/2002 | Boer | |
| 6,688,050 B2 * | 2/2004 | Sagiao | 52/126.1 |
| 6,809,251 B2 * | 10/2004 | Dinwoodie | 136/251 |
| 6,966,531 B2 * | 11/2005 | Curtin | 248/237 |
| 7,155,870 B2 * | 1/2007 | Almy | 52/544 |
| 7,192,146 B2 * | 3/2007 | Gross et al. | 359/853 |
| 2006/0053706 A1 * | 3/2006 | Russell | 52/173.3 |

* cited by examiner

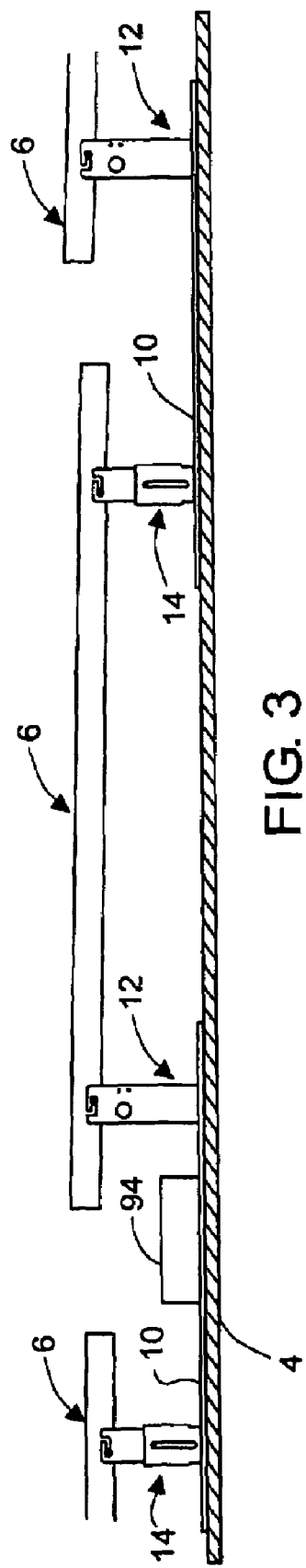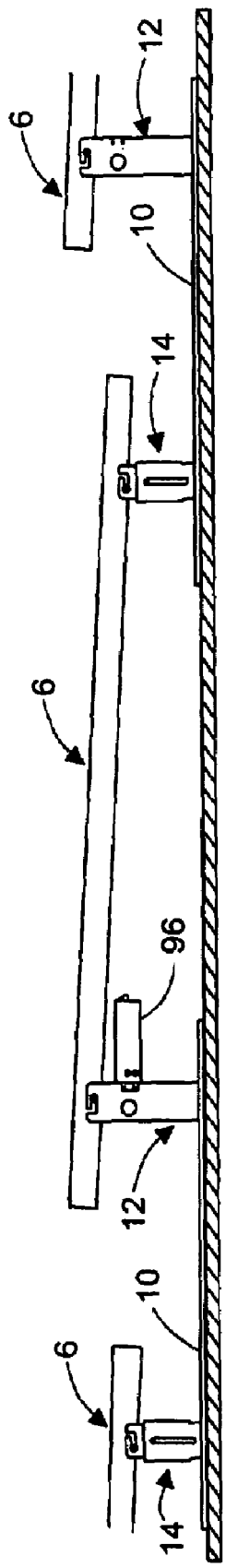

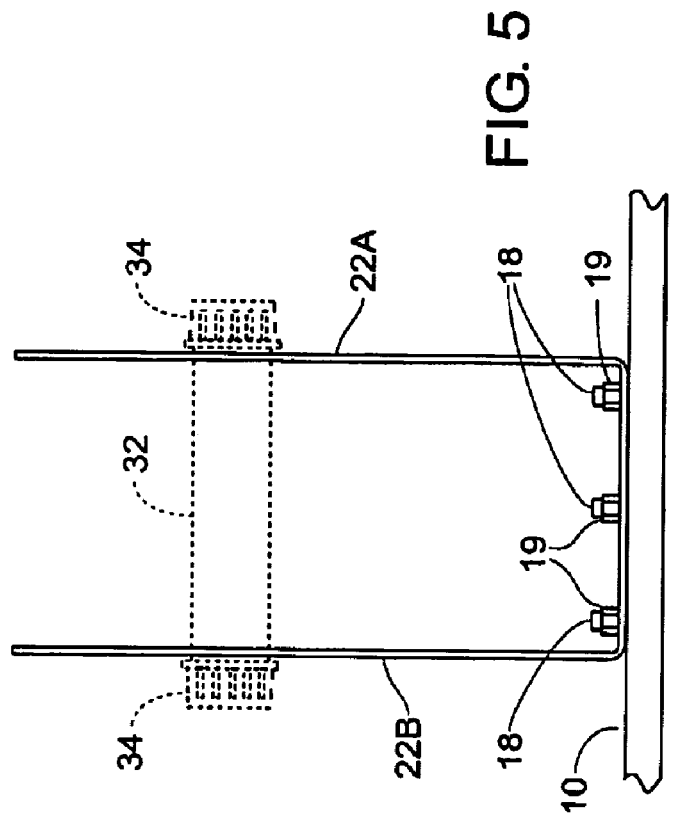
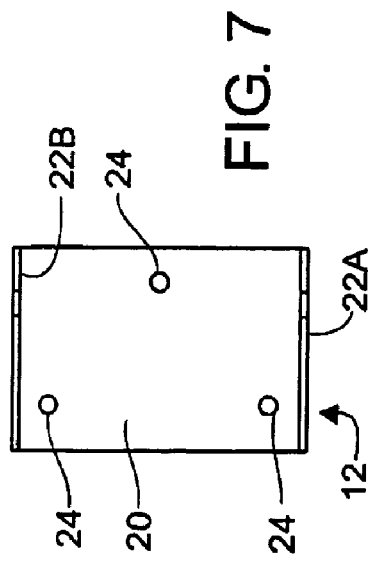
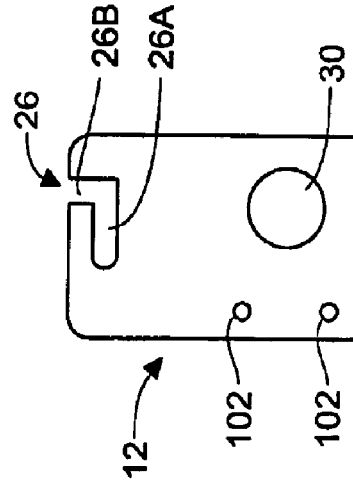

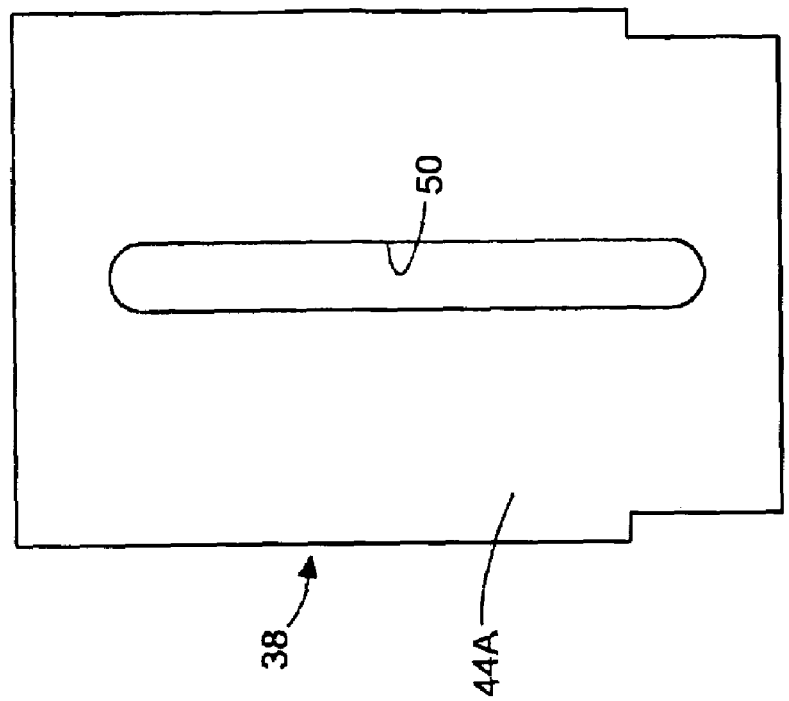
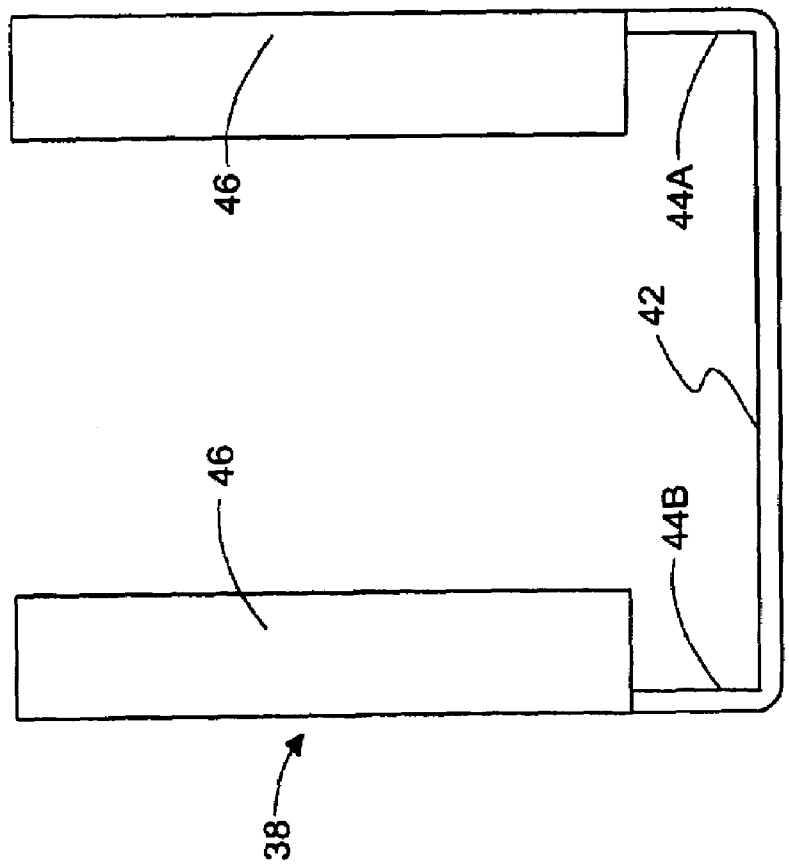

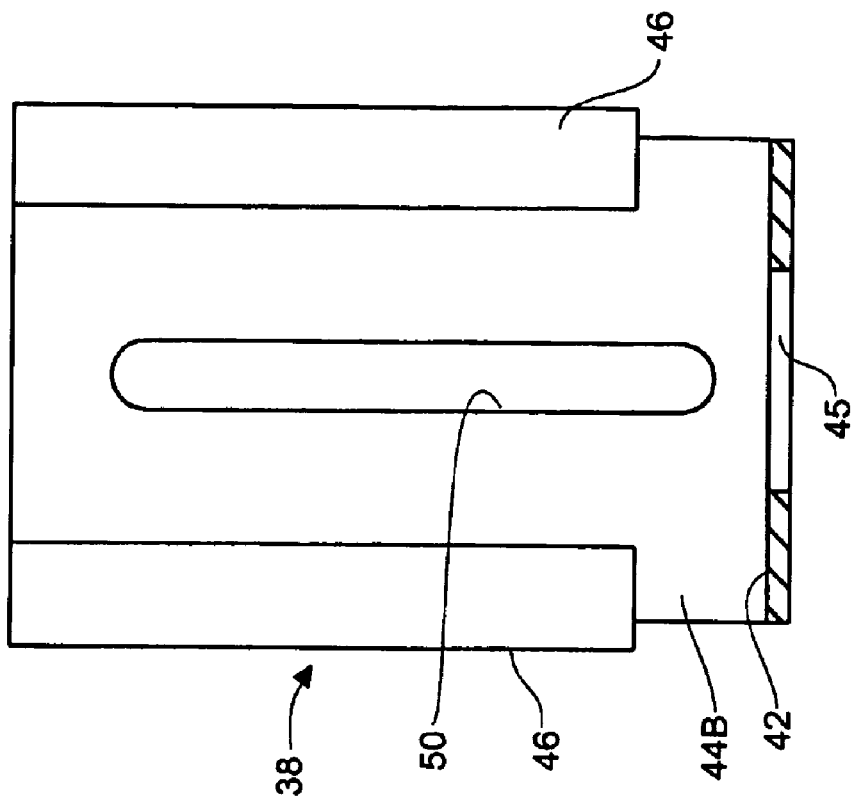
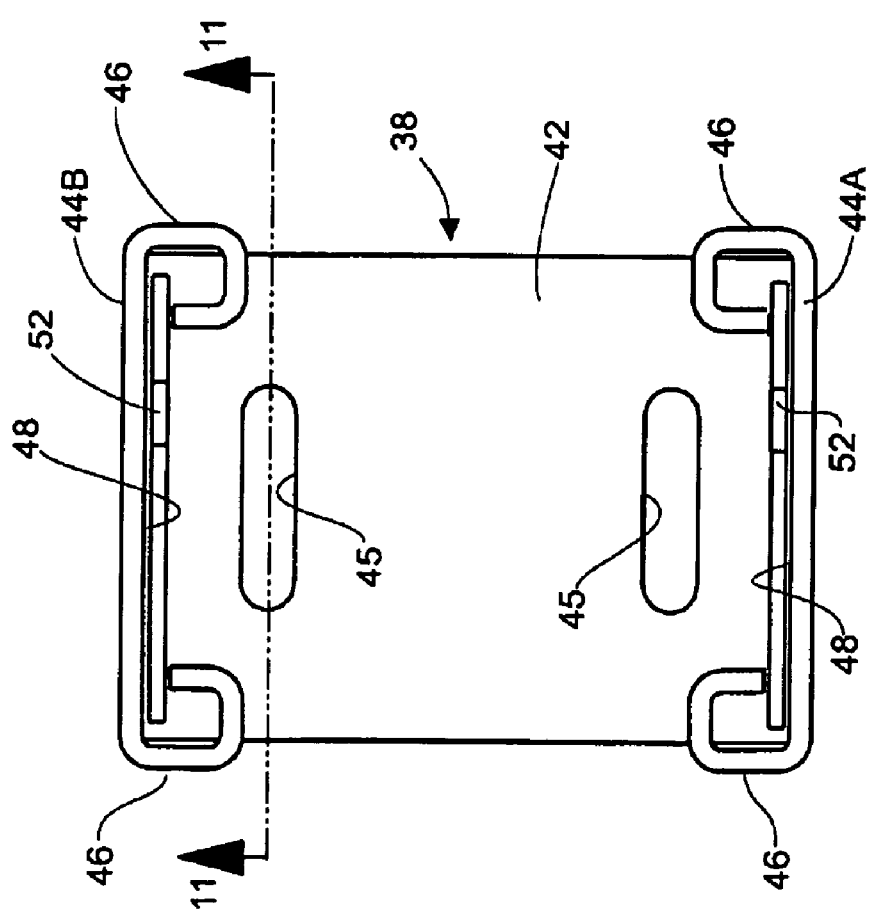
FIG. 11
FIG. 10

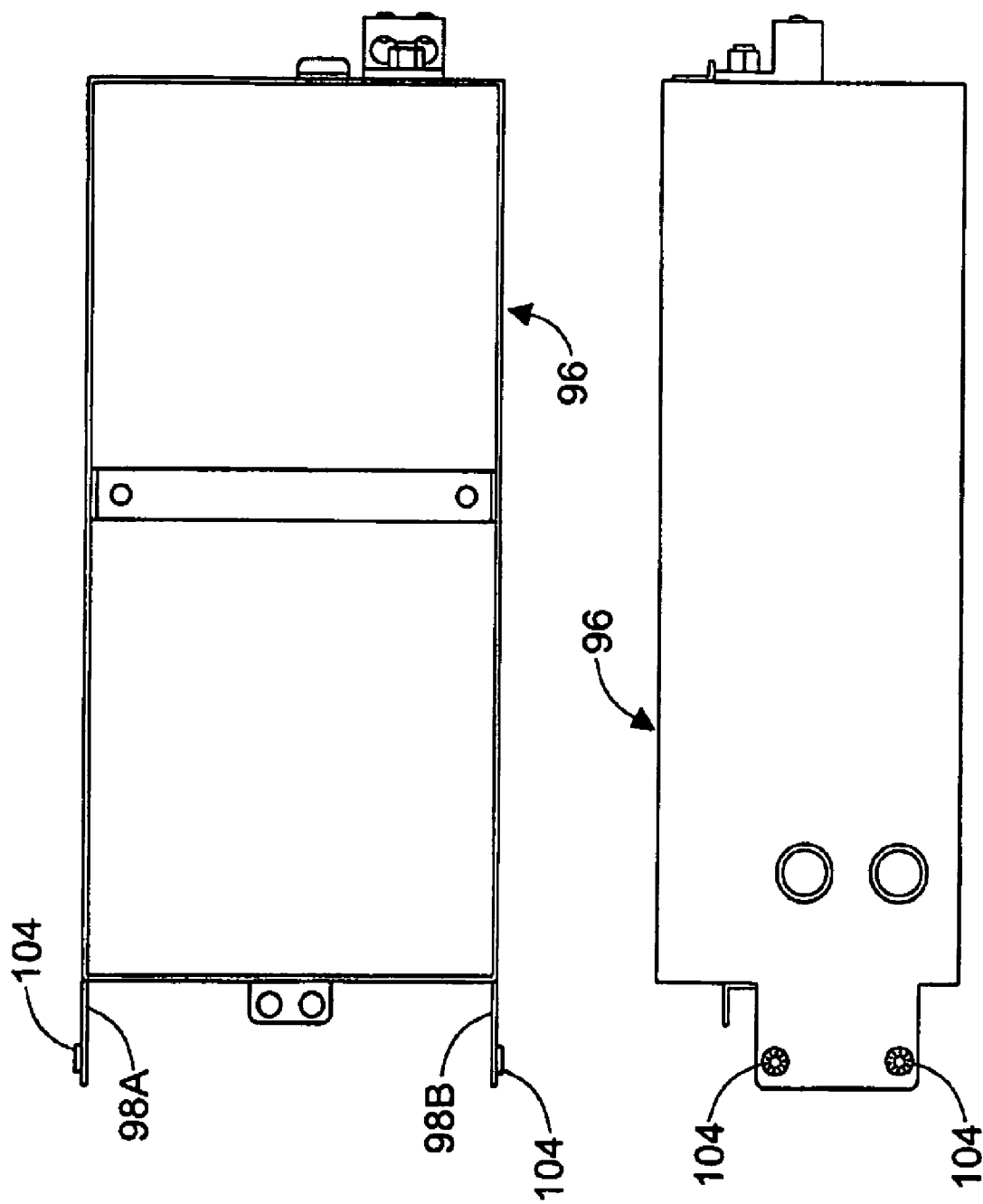

APPARATUS AND METHOD FOR MOUNTING PHOTOVOLTAIC POWER GENERATING SYSTEMS ON BUILDINGS

This application claims the benefit of the filing date of U.S. Provisional Application Ser. No. 60/371,576, filed 11 Apr. 2002 by Miles C. Russell for "Corner-Jack Photovoltaic Mounting System".

This invention was made using government funds under Department of Energy Subcontract No. NREL NDO-2-30628-05.

FIELD OF THE INVENTION

This invention relates generally to installation of photovoltaic power generating systems and in particular to a novel approach for mounting photovoltaic modules on the roofs of buildings.

BACKGROUND OF THE INVENTION

As used herein the term "PV module" identifies a photovoltaic power generating unit in the form of an integrated structure comprising a plurality of electrically interconnected photovoltaic cells and means for supporting and protecting the cells, and the term "PV module assembly" identifies a structure comprising two or more PV modules that are mechanically ganged together and electrically interconnected to form a unitary power source. A variety of systems and methods have been devised for mounting PV modules and associated components of solar electric (PV) power generating systems on buildings. The market for solar electric power generating systems that operate in parallel with existing grid electricity supply and that can be safely and simply installed on the rooftops of businesses, factories, schools, hospitals, commercial establishments and the like, is growing rapidly in the United States and elsewhere. As the cost per watt has dropped in recent years for photovoltaic units, the need for improving methods of mounting photovoltaic modules to building roofs has become more critical. More precisely, as the cost of solar cells per se has declined, the non-solar cell components required for installing a functioning photovoltaic system become more critical with respect to overall system costs. However, care must be taken to insure that photovoltaic systems are installed with due respect to environmental factors such as wind-loading and environmental stresses, and preserving building integrity, notably, avoiding the use of mechanical fasteners that penetrate the roof.

A number of different approaches have been taken with respect to providing means for supporting photovoltaic panels on a roof. These prior methods are exemplified by the inventions described in U.S. Pat. No. 4,886,554, issued 12 Dec. 1989 to Woodring et al for "Solar Roofing Assembly"; U.S. Pat. No. 5,746,839, issued 5 May 1998 to Thomas L. Dinwoodie for "Lightweight, Self-Ballastng Photovoltaic Roofing Assembly"; and U.S. Pat. No. 6,148,570, issued 21 Nov. 2000 to Thomas L. Dinwoodie et al for "Photovoltaic Building Assembly With Continuous Insulation Layer".

U.S. Pat. No. 6,148,570 discloses a photovoltaic building assembly comprising the use of a plurality of PV module support assemblies to support photovoltaic modules in close proximity to one another on a roof or other building support surface on which the photovoltaic building assembly is installed. Each of the PV module support assemblies comprises a base located on the building support surface, and an outwardly extending portion that projects through a continuous insulation layer, preferably in the form of a sprayed-on foam insulation layer, that covers the building support surface and the base of the PV module support assembly. The PV modules are mounted to and supported by the outwardly extending portions of the module support assemblies above the insulation layer. The base of the PV module support assembly may be made of concrete pavers or other heavy material to help counteract wind-induced uplift and sliding forces by their weight alone. U.S. Pat. No. 6,148,570 also teaches that by having their bases embedded within the insulation layer, and also by being fastened to the building support surfaces by adhesive or through the use of mechanical fasteners which may, or may not penetrate the building support surface, additional stability and mounting strength is achieved. The patent also suggests that the base portions may be sized so that embedding them within the insulation layer may be all that is needed to secure the PV module support assemblies to the building support surface. A characterizing aspect of the photovoltaic building assembly disclosed in U.S. Pat. No. 6,148,570 is that each PV module support assembly extends horizontally parallel to and in supporting relation to the mutually confronting edges of two adjacent modules, with each side of each module being supported by a different PV module assembly and adjacent modules being close to one another so as to form a covering for the supporting roof structure.

OBJECTS AND SUMMARY OF THE INVENTION

A primary object of the invention is to provide a new and improved method and apparatus for mounting PV modules to a building roof.

A more specific object is to provide an improved system for mounting PV modules to flat roofs typical of commercial buildings that is economical, requires no special tools for installation and can be used with a variety of roofing surfaces.

Another specific object of the invention is to provide a system for mounting solar modules on a building roof that eliminates the need for mechanically or adhesively attaching the module-mounting structure to the building roof, whereby to preserve the integrity and waterproof characteristics of the supporting roof structure.

A further object of the invention is to provide a new and improved system for mounting solar modules on roofs that provides for walkways between rows of solar modules for easy access for servicing and repair.

Still another object is to provide a photovoltaic module mounting system that is adapted to mount PV modules at a selected tilt angle, e.g., in the range of 0°-15°, to benefit annual energy production.

A further object is to provide improved means for mounting a plurality of PV modules on a roof that allows the PV modules to shift from a tilt position to a near horizontal position in response to pressure differentials caused by extreme winds, whereby to release wind pressure and reduce or substantially eliminate wind uplift forces.

These and other objects are achieved by providing a mounting system for PV modules and PV module assemblies in the form of a plurality of mounting stands that are intended to rest on a supporting roof, with each mounting stand consisting of a base plate, and first and second brackets attached to the base plate. The base plate rests on the supporting roof and is sized to introduce a defined separation distance between rows of PV modules to minimize row-to-row shading. The base plate also is sized also to distribute the dead load and to reduce the downward pressure on the supporting roof structure. The first and second brackets are secured at opposite ends of the base plate. These mounting stands are distributed in spaced relation to one another on a supporting roof in a row and column arrangement. The first and second brackets may be of fixed height, with one bracket being taller than the other. Preferably, however, one bracket has a fixed height and the second bracket is constructed to permit its effective height to vary from a first minimum value that is less than that of the first bracket to a second maximum value that is substantially the same as that of the first bracket. In the preferred embodiment, each bracket has dual members for supporting two different PV modules or PV module assemblies. The PV modules are rectangular or square and are supported by the mounting stands by attaching a corner of each module to a different mounting bracket. More specifically, two corners of each module are mounted to different first brackets and the other two corners of each module are attached to different second brackets. The first and second brackets of each mounting stand introduce a controlled gap between adjacent PV modules in a row. The distributed mounting stands and the supported PV modules provide sufficient weight to resist movement by wind uplift forces resulting from wind velocities of up to about 70 miles per hour. Under higher velocity winds, e.g., winds up to about 110 miles per hour, the ability of the mounting stands and the supported PV modules to withstand movement is enhanced and preserved by the ability of the second brackets to extend their heights so as to shift the modules to a near horizontal position, thereby releasing wind pressure on the modules and reducing wind uplift forces. Depending on the size of the modules, several modules may be ganged together to form a discrete PV module assembly, with each PV module assembly being supported at two spaced apart points by separate first brackets and at two other points by separate second brackets.

Other features and advantages of the invention are disclosed or rendered obvious by the following detailed description which is to be considered together with the accompanying drawings.

THE DRAWINGS

FIGS. 2 and 3 are fragmentary sectional views in side elevation illustrating how the preferred form of mounting apparatus is adapted to permit the PV modules to change positions;

FIG. 5 is a front elevational view showing one of the taller brackets for supporting a solar module mounted on a base plate;

FIG. 6 is a side view in elevation of the same bracket;

FIG. 7 is a plan view of the same bracket;

FIG. 8 is a front view in elevation of the bottom part of the adjustable bracket assembly;

FIG. 9 is a side view in elevation of the member shown in FIG. 9;

FIG. 10 is a plan view of the bottom portion of the adjustable bracket assembly;

FIG. 11 is a sectional view taken along line 11-11 of FIG. 10;

FIG. 14 is a side view in elevation of a junction box adapted for attachment to the PV mounting apparatus of the present invention; and.

FIG. 15 is a plan view of the same junction box.

In the several figures, like components are identified by like numerals.

SPECIFIC DESCRIPTION OF THE INVENTION

Figure 1:
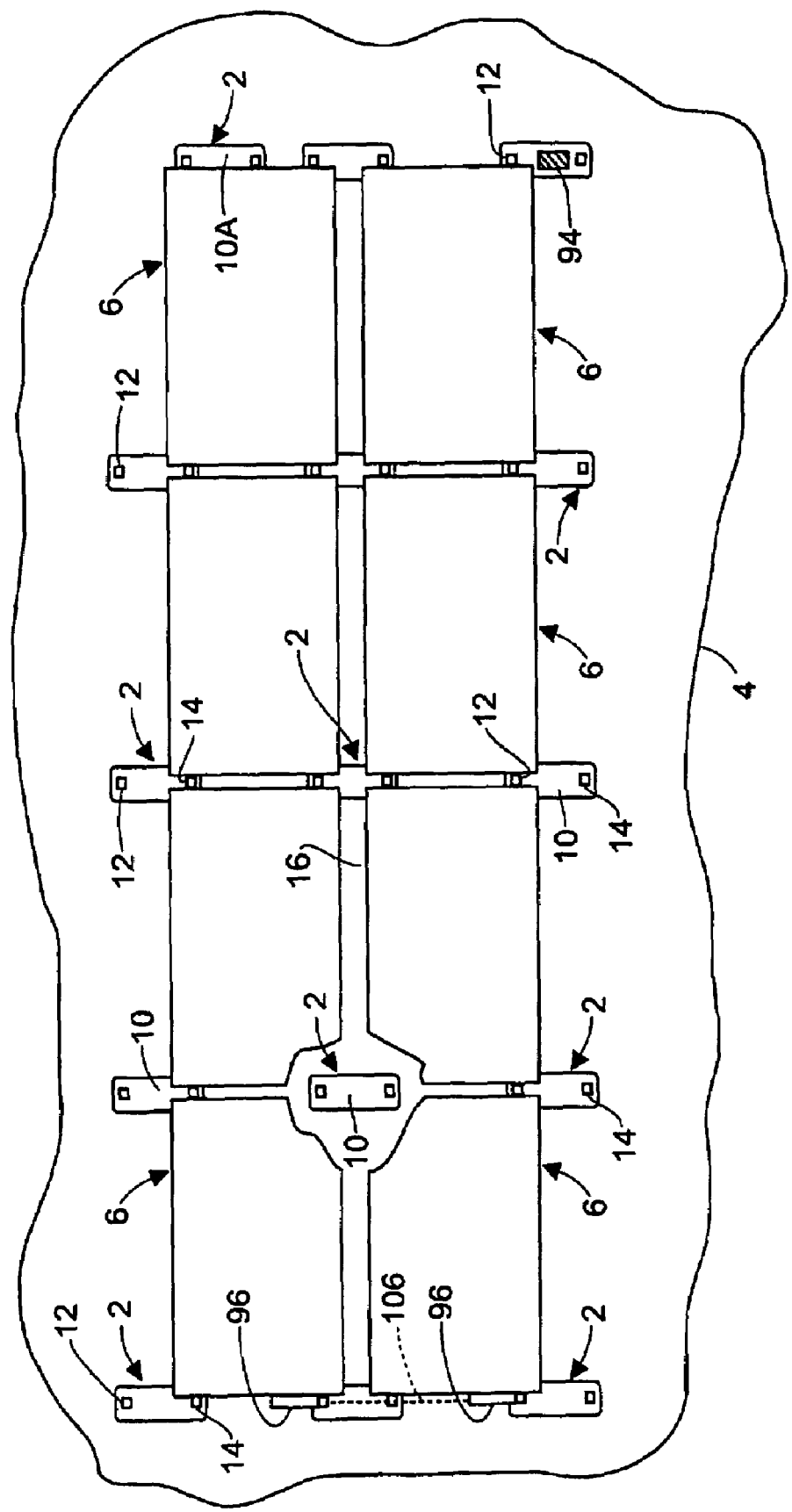
FIG. 1 is a plan view illustrating a number of PV modules and apparatus embodying the present invention for mounting the modules on a roof, with certain of the PV modules being broken away for illustrative purposes only.

Referring to FIGS. 1, 2 and 3, the invention comprises a set of mounting stands 2 that are distributed on a supporting roof structure 4 and support a plurality of PV modules 6, with each stand consisting of a base plate 10 and two mutually spaced brackets 12 and 14 that are attached to opposite ends of the base plate. The brackets 12 are of fixed height. The other brackets 14 also may be of fixed height and shorter than brackets 12 in order to provide a selected angle of tilt to PV modules. Preferably, however, the brackets 14 are adjustable in height, as hereinafter described.

The mounting stands are laid out on a flat roof in a rectangular grid pattern of rows and columns as shown in FIG. 1, with the row and column spacing being determined by the dimensions of the solar modules panels to be mounted as well as the tilt angle and site latitude. Preferably the base plates 10 of the mounting stands are sized to introduce a defined separation distance between the rows of PV modules 6, with that separation distance being set to minimize row-to-row shading and also to provide spaces 16 between adjacent rows of modules that are wide enough to serve as walkways for easy access to the modules for service and repair. Base plates 10 also are sized so as to distribute the dead load and reduce the downward pressure on the roof from the weight of the mounting stands and the modules supported by the mounting stands.

In the preferred embodiment of the invention, the base plates and the brackets are made of sheet metal, e.g., aluminum, but they could be made of some other material. If desired, the base plates may be provided with an adhered cushioning material on their undersides to protect the roof surface. Such a cushioning material may be desirable where the base plates rest on a waterproofing diaphragm covering a roof surface.

The base plates 10 are provided with fastener elements for securing the brackets in place. Preferably, but not necessarily, the fasteners are in the form of vertically-projecting threaded studs 18 (FIGS. 5, 7) that are permanently secured to the base plates. Of course, the fastener elements could take other forms, e.g., they may be separate screw fasteners inserted into holes in the base plate, with those holes being countersunk to accommodate the heads of the fasteners, so as to prevent the fastener heads from injuring the underlying roof surface.

Referring to FIGS. 5-7, the taller brackets 12 of U-shaped configuration, comprising a flat base portion 20 and a pair of vertically-extending arms 22A and 22B. The flat base portion 20 is provided with a plurality of openings 24 to accommodate the threaded studs 18 of the associated base plate. Nuts 19 are threaded onto studs 18 to releasably anchor brackets 12 to base plates 10. The upper ends of arms 22A and 22B are provided with identical L-shaped slots 26 comprising horizontal portions 26A and vertical entry portions 26B that are used to receive mounting pins(described hereinafter) on the PV modules (or the PV module assemblies). Additionally, the arms 22A and 22B of brackets 12 may be provided with enlarged openings 30 to accommodate a nipple 32 (shown in phantom in FIG. 5) that serves as a protective conduit for electrical wires (not shown) that are used to interconnect the modules. The nipples are secured to brackets 12 by means of bushings 34 (also shown in phantom) that are attached to the opposite ends of the nipples by screw connections or some other suitable connecting means.

Referring now to FIGS. 8-13, it is preferred that the other brackets 14 be adjustable in height. In their preferred form, each bracket 14 comprises a U-shaped bottom part or anchor member 38 and two identical slidable parts or slides 40A and 40B. The anchor member 38 comprises a transversely-extending base 42 and two parallel arms 44A and 44B that extend vertically upward from base 42. The base 42 is provided with two elongate holes 45 to accommodate threaded studs (not shown but like studs 18) that project upwardly from the base plate in the same manner as studs 18 secure brackets 12. Each of the arms 44A and 44B is bent back along its two opposite side edges as shown at 46, so that the end faces of those edges confront the adjacent inner surface 48 of the arm. The end faces of those edges are spaced from surfaces 48 so as to form a channel to receive the slides 40A and 40B. Nuts (not shown but like nuts 19) are threaded onto the upwardly-projecting studs or fasteners to anchor the bottom parts 38 of anchor members 14 to base plates 10. Additionally, each of the arms 44A and 44B of anchor members 38 are provided with a vertically elongate hole 50.

Figure 13:
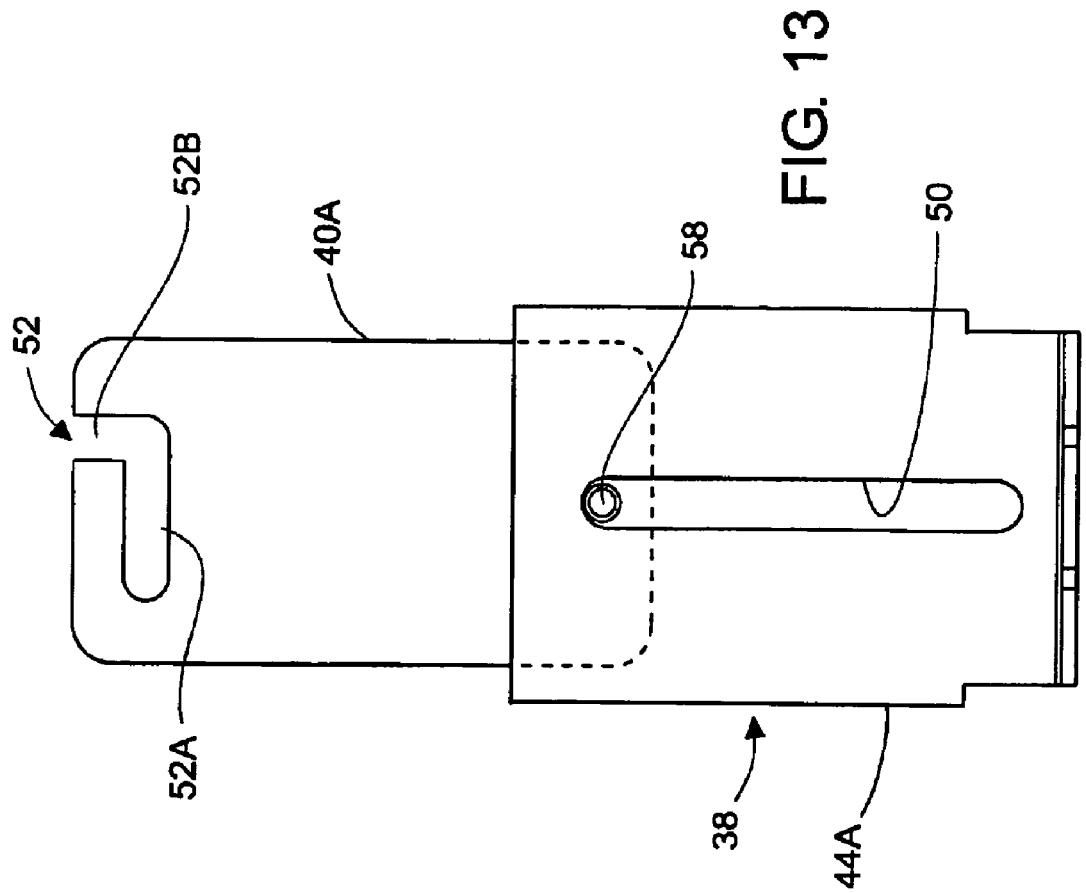
FIG. 13 is a side elevational view illustrating the adjustable bracket assembly in extended position.
Figure 12:
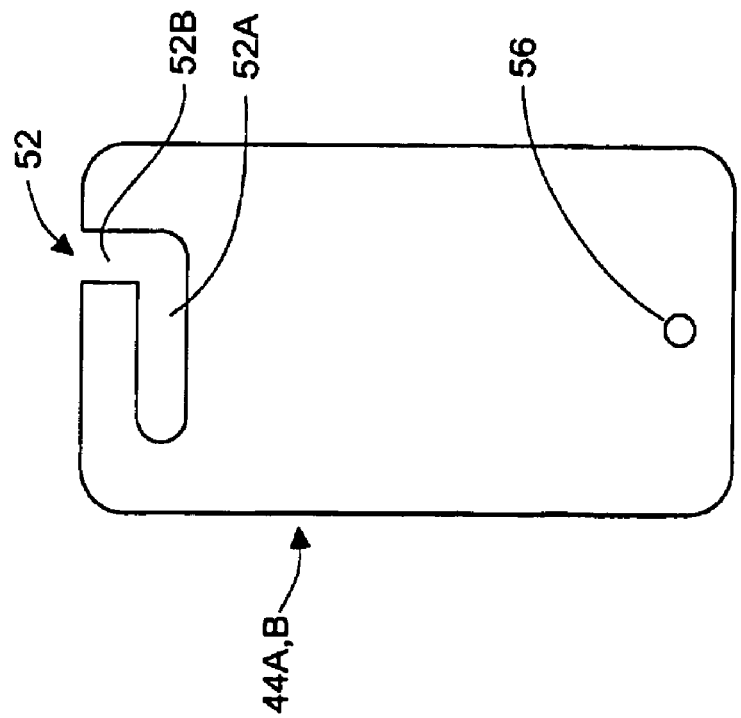
FIG. 12 is a side view in elevation of one of the slide members of the adjustable bracket assembly.

Referring now to FIGS. 10, 12 and 13, the slidable parts or slides 40A and 40B have a thickness substantially the same as arms 22A and 22B, and are provided at their top ends with identical L-shaped slots 52, comprising horizontal portions 52A and vertical entry portions 52B, that receive mounting pins on the PV modules (or on PV module assemblies). Each of the slides 40A and 40B also is formed with a hole 56 (FIG. 12) and anchored in that hole is a laterally projecting stud 58 (FIG. 13) which is sized to make a sliding fit in the elongate hole 50 of one of the arms 44A and 44B. As seen in FIG. 10, each of the slides 40A and 40B has a thickness that is slightly less than the gap between the end faces of the bent edges of arms 44A and 44B and their inner surfaces 48, whereby to simultaneously enable the slidable parts 40A and 40B to move up and down relative to the bottom part 38 with only minimal play in a direction perpendicular to inner surfaces 48. The length of elongate holes 50 determines the extent to which the slides may be moved up and down relative to anchor member 38. Also the lengths of slides 40A and 40B, arms 44A and 44B and holes 50, and the positions of the L-shaped slots 52 are set so as to assure (1) a selected tilt angle for the modules supported by brackets 12 and 14 when the slides are in their bottommost position and (2) a substantially horizontal position for the same modules when slides 40A and 40B are extended to the uppermost position determined by studs 58 reaching the top ends of elongate holes 50. Brackets 12 and 14 are oriented on base plates 10 so that the ends of horizontal portions 26A and 52A of slots 26 and 52 remote from vertical entry portions 26B and 52B face away from each other, as shown in FIGS. 2 and 3.

Figure 4:
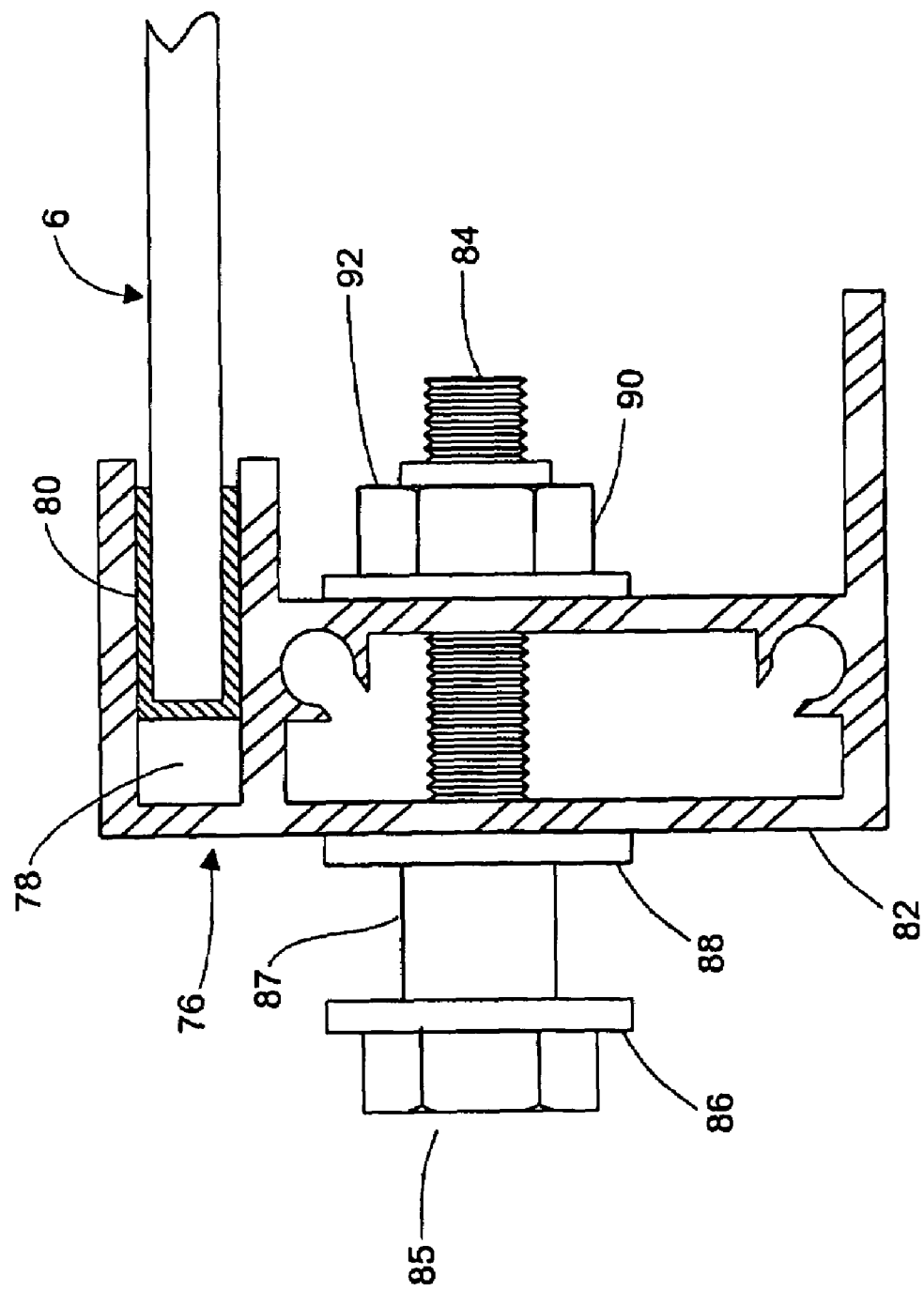
FIG. 4 is a fragmentary cross-sectional view of one of the PV modules showing one form of mounting stud arrangement.

FIG. 4 illustrates how a PV module is adapted for the present invention. The form of PV module is not critical to this invention and may take various forms well known in the art. For that reason, and also for convenience of illustration, the internal structure of the module is not illustrated. Suffice it to say that the module has a square or rectangular configuration. By way of example but not limitation, PV modules commonly are in the form of a laminated sandwich that comprises a front panel made of transparent glass, a back panel made of glass, Tedlar®, or some other material, and a plurality of interconnected photovoltaic cells and a transparent encapsulant disposed between the front and back panels in a hermetically sealed arrangement. A frame may be provided to protect the edges of the laminated components and also to facilitate handling and mounting. This form of PV module is described and illustrated in U.S. Pat. Nos. 5,228,924, issued Jul. 20, 1993 to James M. Barker et al., and, 5,478,402, issued Dec. 26, 1995 to Jack I. Hanoka. U.S. Pat. No. 5,228,924 also shows how a plurality of PV modules can be ganged together to form a multi-module assembly.

In FIG. 4, the PV module is provided at its margins with a protective frame 76 which preferably, but not necessarily, is made of a metal such as aluminum or stainless steel and defines a channel 78 that is sized to make a close fit with the module. A suitable sealant or gasket 80 may be provided between the edges of the module and the frame. In this illustrated embodiment, the frame has a standoff portion 82 with a depth sufficient to accommodate mounting pin assemblies for connecting the PV module to the brackets 12 and 14. The mounting pin assemblies may take various forms. A preferred form of mounting pin assembly comprises a threaded pin or stud 84 having a head 85. Mounted on each stud are two washers 86 and 88 and a spacer sleeve 87 that keeps those washers spaced apart by a distance that preferably is about two to three times greater than the thickness of the arms 22A and 22b of brackets 12 and the thickness of slides 40A and 40B of brackets 14. The studs 84 are mounted in holes in frame 76 and are secured in place by nuts as shown at 90, preferably with addition of another washer 92. Each stud is locked against axial movement relative to the frame by tight engagement of opposite sides of standoff portion 82 by washers 88 and 92. Each module is provided with four mounting pin assemblies, each adjacent a different corner of the PV module.

Mounting a plurality of PV panels 6 on a roof by means of the present invention involves first placing a plurality of stands 2 on a roof in a grid pattern of rows and columns as shown, with the stands all oriented in the same direction so that the brackets 14 of the stands in one row face the brackets 12 of the stands in the next immediate row. The stands are set with each bracket 14 loosely attached to its base 10 so that it can be moved over a short range determined by the length of the elongate holes 45 in the base of its anchor member 38. Then individual modules 8, each with mounting pins 84 at their four corners, are attached to the brackets. Each module in turn is positioned so that two of its mounting pins 84 are inserted into slots 26 of one of the arms 22A or 22B of brackets 12 of adjacent stands 2 in one row and the other two of its mounting pins are inserted into the slots 52 of one of the slides 40A or 40B of the brackets 14 of two adjacent stands 2 in the next row of stands. With the mounting pins 84 of each module so engaged with brackets 12 and 14 of four different stands 2, the brackets 14 supporting each module are moved away from the brackets 12 supporting the same modules, whereby locking pins 84 of the modules are engaged with the ends of slots 26A and 52A that are remote from their entry portions 26B and 52B respectively. Then the nuts (not shown) coupling the brackets 14 to studs on the base plate are secured, so as to lock those brackets to the base plate. Essentially the brackets are positioned so as to capture mounting pins 84 in slots 26 and 52, thereby preventing the PV modules from being lifted out of engagement with the brackets without first loosening the fasteners that hold brackets 14 to the base plates, and then moving brackets 14 in a direction and for a sufficient distance permitted by holes 45 to allow the locking pins 84 to be lifted out of slots 26 and 52. To summarize, each of the arms 22A and 22B of brackets 12 is engaged by a locking pin assembly of a different solar module, and the same is true of the sliding members or slides 40A and 40B of the other brackets 14, i.e., each bracket 12 and 14 is connected to and supports two different modules.

Referring to FIG. 2, brackets 14 are arranged so that when the slides 40A and 40B are in their lowermost position, the modules 6 are at a selected angle of tilt, e.g., 5°, determined by the fixed height of brackets 12 and the effective minimum height of the brackets 14. The length of elongate holes 50 in the anchor members of brackets 14 is such that when the studs 58 engage the upper ends of those holes, slides 40A and 40B coact with brackets 12 to support the PV modules in a substantially horizontal position (FIG. 3). Having the slides 40A and 40B free to move upwardly instead of locking them to anchor members 38 is advantageous—when extreme winds occur, brackets 14 will respond to pressure differentials on the PV modules the shifting upward of slides 40A and 40B, thereby releasing wind pressure and reducing or substantially eliminating excessive wind uplift forces on the modules and the stands 2. With this dynamic feature, every PV module (or PV assembly where two or more PV modules are ganged together) can independently adjust its tilt angle to eliminate uplift forces from high velocity winds. In this connection it should be noted that an important aspect of the invention is that all of the PV modules are mechanically linked together by the mounting stands, thereby aiding in resisting movement under the force of winds.

If desired, ballast can be added around the perimeter of the array of installed modules to aid in resisting movement under unusual wind forces. Thus, for example, as shown in FIGS. 1 and 2, paver blocks 94 may be placed on the base plates to add stability against uplifting wind forces.

A further aspect of the invention is that the invention may include provision of junction boxes as shown at 96 in FIGS. 1, 2, 14 and 15. The junction boxes are formed with two arms 98A and 98B projecting forwardly or from opposite sides. Arms 98A and 98B are attached to the upstanding arms 22A and 22B respectively of a bracket 12 by means of screws (not shown) that pass through holes 102 in bracket arms 22A and 22B, and screw into nuts 104 welded to arms 98A and 98B in coaxial relation to the holes in those arms. The junction boxes may be interconnected by wiring as indicated by the dotted line 106 in FIG. 1 and serve to interconnect rows of modules while the nipples 32 serve as pass-throughs for wiring that interconnects the several modules in a row.

A feature of the invention is that at the perimeter of an array of modules on a roof, the orientation of the base plates may be reversed as demonstrated by the position of the base plate 10A in FIG. 1, so as to minimize the extent to which it protrudes from the mounted array of PV modules. This feature is significant when the outermost PV modules are close to the perimeter of the supporting roof structure.

The foregoing invention offers a number of advantages. First of all, no penetrations of the building roof are required, except as may be required to route wiring from the PV array into the supporting building. In this connection, actual tests have demonstrated that an array of PV modules supported by free-standing stands 2 as herein described, i.e., without the stands being secured to a roof or other supporting structure by any mechanical or adhesive fastening means, is capable of withstanding winds of a velocity in excess of 110 miles per hour without undergoing any movement due to the wind forces. Secondly, the entire weight of the distributed mounting stands and the modules carried thereby can be kept at below 3 pounds per square foot, so that the added loading on the building is well within the limits of typical building code requirements. A third advantage is that the mounting system is adaptable for use with individual large area PV modules and also with PV module assemblies. In the case of PV module assemblies, the several modules may be held fixed in side-by-side relation by pair of elongate rods, typically of C-shaped cross-section, that span across and are secured to the several PV modules. In such case, the locking pin assemblies are attached to those rods that span the several modules, with each PV module assembly having two locking pin assemblies attached to each support rod, with the four locking pin assemblies being located at points that define a square or rectangle, so that each PV module assembly can be supported in the same manner as a single module as described above.

Still other advantages are as follows: (1) the angle of tilt can be adjusted to benefit annual energy production; (2) the mounting system assures that the PV modules are open on all sides and provides space between the PV modules and the supporting roof structure, whereby to provide ambient air circulation and passive cooling, to the benefit of module efficiency, energy production and life expectancy; (3) the mounting system can be deployed on a flat roof of any type construction, including those having a spray-on foam insulation (the foam insulation may be applied after the stands 2 have been placed on the underlying roof structure); (4) the provision of protective conduits as shown at 32 and junctions boxes as shown at 96 simplifies PV array wiring and expedites field labor; (5) the modules may be mounted so as to provide adequate space between rows of modules for easy access for service; (6) the mounting system permits easy replacement of modules and removal of modules for roof inspection or repair; (7) the dynamic feature provided by having extendible brackets 14 is beneficial in that the mounting system automatically responds to high velocity wind, allowing the modules to reduce horizontal blockage by traveling to a shallower tilt angle and thereby reducing or eliminating uplift forces; and (8) the invention may be used with different forms of modules. Other advantages will be obvious to persons skilled in the art.

The invention is susceptible of modifications. For example, the sizes of the base plates and the brackets 12 and 14 may be varied. Additionally, the brackets 14 may be of fixed height rather than extendible as shown, with brackets 12 and 14 being made to support PV modules at a selected angle of tilt. Also, the brackets 14 could be modified to permit locking the slides against telescoping movement. By way of example, such locking action may be achieved by providing a screw thread on the outer end of studs 58 and mounting a washer and nut on each stud so that the washer engages the outer surface of arm 44A or 44B. Tightening the nut to force the washer to grip the outer surface of arm 44A or 44B will lock the associated slide 40A or 40B against up or down movement. It is to be appreciated also that the mounting pin assemblies may be modified and that a different mode of interlocking the modules to the brackets may be used. For example, the locking pin assemblies may be replaced L-shaped brackets, with each such bracket having one leg attached to the PV module and the other leg attached to a bracket 10 or 12 by a screw-and-nut connection. Still other modifications will be obvious to persons skilled in the art.

What is claimed is:

1. A photovoltaic assembly in combination with a building roof, said assembly comprising:
    a plurality of PV modules; and
    a plurality of PV module mounting stands distributed on said roof, each of said mounting stands comprising a base plate resting on said roof, and first and second brackets mounted to said base plate in spaced relation to one another;
    each of said first brackets comprising first and second module-supporting means extending upwardly from said base plate away from said roof and each of said second brackets comprising third and fourth module-supporting means extending upwardly away from said base plate away from said roof, said first and second module-supporting means of each first bracket being attached to a first and second PV modules respectively and said third and fourth module-supporting means of each second bracket being attached to third and fourth PV modules respectively, with each of said PV modules being supported in vertical spaced relation to said roof by the first module-supporting means of a first bracket of a first mounting stand, the second module-supporting means of a first bracket of a second mounting stand, the third module-supporting means of a second bracket of a third mounting stand, and the fourth module-supporting means of a second bracket of a fourth mounting stand.

2. Apparatus according to claim 1 wherein said first and second module-supporting means of said first brackets extend vertically away from said roof a greater distance than said third and fourth module-supporting means of said second brackets, whereby said PV modules are tilted relative to said roof.

3. Apparatus according to claim 1 wherein each of said module-supporting means comprises an arm extending vertically away from said roof.

4. Apparatus according to claim 3 wherein said arms of said first and second module supporting means are of fixed length and said arms of said third and fourth module supporting means are of adjustable length.

5. Apparatus according to claim 3 wherein the outer ends of said arms are provided with slots, and said PV modules have mounting pins protruding from opposite side edges thereof that are received in said slots, whereby said modules are attached to and supported by said first and second brackets of said mounting stands.

6. Apparatus according to claim 1 wherein said second brackets are adjustably secured to said base plates so that they can be moved to vary the distance between them and said first brackets.

7. Apparatus according to claim 1 wherein each of said first brackets has a first bottom portion secured to said base plates and said first and second module-supporting means comprise first and second arms respectively attached to and extending upwardly from said first bottom portion, and further wherein each of said second brackets comprises a second bottom portion secured to said one base plate and said third and fourth module-supporting means comprise third and fourth arms respectively extending upwardly from said second bottom portion, and first and second members that are coupled to said third and fourth arms respectively so as to form telescoping extensions of said third and fourth arms respectively, and further wherein said first and second arms of each of said first brackets are attached to said first and second PV modules respectively and said first and second members of each of said second brackets are attached to said third and fourth PV modules respectively.

8. Apparatus according to claim 1 wherein said stands are distributed on said roof in rows and columns, with said first and second module-supporting means of each first bracket being aligned with the first and second module-supporting means of other first brackets in each row of said stands.

9. Apparatus according to claim 1 wherein each module is rectangular and has two mutually-spaced mounting pins projecting from one side thereof and two additional mutually-spaced mounting pins projecting from a second opposite side thereof, and further wherein said module-supporting means have openings in which said connecting pins are received so as to attach said PV modules to said brackets.

10. A photovoltaic assembly in combination with a building roof, said assembly comprising:
a plurality of PV module assemblies, each of said assemblies comprising at least two PV modules that are electrically interconnected and mechanically ganged together; and
a plurality of mounting stands distributed on said roof in rows and columns, each of said mounting stands comprising a base plate resting on said roof, and first and second brackets mounted to said base plate in spaced relation to one another, each of said first brackets comprising a first bottom portion secured to said base plate and first and second arms extending upwardly from said bottom portion, and said second brackets comprising three parts, a first part having a second bottom portion secured to said base plate and third and fourth arms attached to and extending upwardly from said second bottom portion, and second and third parts that are coupled to said third and fourth arms respectively of said first part so as to form telescoping extensions of said third and fourth arms of said first part, and further wherein said first and second arms of each of said first brackets is attached to first and second PV modules respectively and said third and fourth arms of said second brackets are attached to third and fourth PV modules respectively, with each PV module assembly being supported at two different points by a first arm of one first bracket and a second arm of another first bracket and at two additional points by a third arm of one second bracket and a fourth arm of another second bracket so that said each PV module extends at an inclined angle to said roof.

11. Apparatus according to claim 10 wherein said first and second arms of said first brackets extend for a first distance from said base plates, and said second and third parts are movable between a first position in which they extend for a second distance from said base plate that is less than said first distance and a second position in which they extend for a third distance from said base plate that is substantially the same as the same as said first distance.

12. Apparatus according to claim 10 wherein said second and third parts of said second brackets are movable between a first retracted position and a second extended position, and further wherein said PV module assemblies are inclined relative to said roof when said second and third parts are in said first retracted position and are substantially parallel to said roof when said second and third parts are in said second extended position.

13. Apparatus according to claim 10 wherein said roof is flat and extends substantially horizontally.

14. A photovoltaic assembly comprising:
a plurality of mounting stands distributed on a roof in rows and columns, each of said mounting stands comprising a base plate and first and second brackets mounted to said base plate in spaced relation to one another, each of said first brackets comprising a first base portion overlying and attached to said base plate and first and second mutually-spaced arms attached to and extending upwardly from said base portion, each of said second brackets comprising a second base portion and third and fourth mutually-spaced arms attached to and extending upwardly from said base portion, each of said first, second, third and fourth arms having an outer end that is adapted for attachment to a PV module whereby to permit a plurality of PV modules to be supported by said mounting stands; and a plurality of PV modules each comprising four side edge surfaces disposed in a rectangular configuration and first and second mounting pins attached to and protruding from one of said four side surfaces and third and fourth mounting pins attached to and protruding from another of said four side surfaces opposite said one side surface, said PV modules being supported by said mounting stands with each of said PV modules having its said first and second mounting pins attached to said outer ends of said first arm of a first bracket and said third arm of a second bracket respectively, and its said third and fourth mounting pins attached to said outer ends of said second third arm of another first bracket and said fourth arm of another second bracket respectively.

15. Apparatus according to claim 14 wherein said first or second brackets are movable on said base plates, whereby to permit adjustment of the distance between said first and second brackets on said base plates.

16. Apparatus according to claim 14 wherein said outer ends of said first, second, third and fourth arms are provided with slots for receiving mounting pins carried by PV modules.

17. Apparatus according to claim 16 wherein said slots are L-shaped.

18. Apparatus according to claim 14 wherein said base plates are elongate and have a longitudinal axis, and further wherein said arms of said brackets are flat members that have surfaces that extend parallel to the longitudinal axis of the base plate to which the brackets are attached.

19. Apparatus according to claim 14 wherein said third and fourth arms of said second brackets are adjustable in length, whereby to permit said modules to be adjustably positioned at a selected angle relative to said roof.

20. Apparatus according to claim 14 wherein said arms of at least said first brackets are provided with slots at said outer ends thereof to removably accommodate said mounting pins.

21. Apparatus according to claim 14 wherein said arms of at least said second brackets are provided with slots at said outer ends thereof to accommodate said mounting pins.

22. Apparatus according to claim 14 wherein said arms of said first and second brackets are provided with slots at said outer ends thereof to accommodate said mounting pins.

23. Apparatus according to claim 22 wherein said slots are L-shaped, and further wherein each mounting stand has its said first bracket oriented relative to its said second bracket so that the L-shaped slots of the two arms of its said first bracket are oriented in reverse relation to the L-shaped slots of the two arms of its said second bracket.

24. A photovoltaic assembly in combination with a building roof, the assembly comprising:
a plurality of PV module mounting stands distributed on said roof in rows and columns, each of said mounting stands comprising a base plate resting on said roof, and first and second brackets mounted to said base plate in spaced relation to one another, each of said first brackets comprising first and second module support means disposed in spaced side-by-side relation and extending upwardly from said base plate away from said roof, each of said second brackets comprising third and fourth module support means disposed in spaced side-by-side relation and extending upwardly from said base plate away from said roof, said stands being oriented and positioned so that (a) in alternating rows of stands said first and second module support means are aligned with one another and said third and fourth module support means are aligned with one another and (b) in each column each first, second, third and fourth module support means is aligned with other first second, third and fourth module support means respectively; and
a plurality of laminated PV modules each having a rectangular configuration characterized by first and second opposite ends and a first and second opposite sides, first and second mounting pins protruding from said first sides adjacent said first and second ends respectively and third and fourth mounting pins protruding from said second side adjacent said first and second ends respectively;
said PV modules being attached to and supported by said PV module mounting stands in vertical spaced relation with said roof surface, with each PV module having its said first mounting pin attached to said first module-supporting means of one of said first brackets, its second mounting pin attached to said third module-supporting means of one of said second brackets, its said third mounting pin attached to said second module-supporting means of another of said first brackets, and said fourth mounting pin attached to said fourth module-supporting means of another of said second brackets.

25. Apparatus according to claim 24 wherein each of said first and second brackets has a bottom portion attached to one of said base plates, said first and second module-supporting means are attached to and extend a fixed distance upwardly from said bottom portions of said first brackets, and each of said third and fourth module-supporting means comprises a first part attached to said bottom portion of said second brackets and a second part that is attached to one of said PV modules via one of said mounting pins and is movable lengthwise relative to said first part whereby to permit adjustment of the angle of each PV module relative to said roof.

26. Apparatus according to claim 25 wherein said mounting pins are attached to said module-supporting means in a manner that permits pivotal movement of said modules relative to said roof in response to lengthwise movement of said second parts relative to said first parts.

27. Apparatus according to claim 24 wherein said first brackets have conduits to accommodate electrical conductors for electrically interconnecting PV modules.

28. A photovoltaic assembly in combination with a building roof, said assembly comprising:
a plurality of PV module mounting stands distributed on said roof in rows and columns, said mounting stands having module support arms that extend vertically up away from said roof, with each module support arm having an upper end with a slot extending in from an edge thereof; and
a plurality of rectangular PV modules each having first and second opposite end edges and a first and second opposite side edges, first and second mounting pins protruding from said first side edges adjacent said first and second end edges respectively and third and fourth mounting pins protruding from said second side edge adjacent said first and second end edges respectively;
each PV module having its said first, second, third and fourth mounting pins removably positioned in said slots of the module support arms of first, second, third and fourth mounting stands respectively, whereby said PV modules are supported by said mounting stands in spaced relation with said roof.

* * * * *

UNITED STATES PATENT AND TRADEMARK OFFICE
CERTIFICATE OF CORRECTION

| | |
|---|---|
| PATENT NO. | : 7,435,897 B2 |
| APPLICATION NO. | : 10/506145 |
| DATED | : October 14, 2008 |
| INVENTOR(S) | : Miles Clayton Russell |

Page 1 of 1

It is certified that error appears in the above-identified patent and that said Letters Patent is hereby corrected as shown below:

Column 9, claim 1, line 6, delete "a";

Column 9, claim 7, line 42, change "plates" to -- plate --;

Column 10, claim 11, line 42, delete "the same as";

Column 12, claim 24, line 8, delete "a"; and

Column 12, claim 28, line 53, delete "a".

Signed and Sealed this

Thirtieth Day of December, 2008

JON W. DUDAS
*Director of the United States Patent and Trademark Office*